United States Patent
Tauferner

(10) Patent No.: US 10,344,469 B2
(45) Date of Patent: Jul. 9, 2019

(54) REINFORCED WATER-RESISTANT BOARD WITH TRAFFIC COAT

(71) Applicant: Piotr Robert Tauferner, Lindenhurst, NY (US)

(72) Inventor: Piotr Robert Tauferner, Lindenhurst, NY (US)

(\*) Notice: Subject to any disclaimer, the term of this patent is extended or adjusted under 35 U.S.C. 154(b) by 0 days.

(21) Appl. No.: 15/665,714

(22) Filed: Aug. 1, 2017

(65) Prior Publication Data

US 2018/0010328 A1 Jan. 11, 2018

Related U.S. Application Data

(60) Continuation-in-part of application No. 15/044,376, filed on Feb. 16, 2016, now Pat. No. 9,719,247, which
(Continued)

(51) Int. Cl.
*E04B 1/66* (2006.01)
*E04C 2/34* (2006.01)
(Continued)

(52) U.S. Cl.
CPC ............... *E04B 1/665* (2013.01); *B32B 3/02* (2013.01); *B32B 3/06* (2013.01); *B32B 3/30* (2013.01); *B32B 5/02* (2013.01); *B32B 5/022* (2013.01); *B32B 5/12* (2013.01); *B32B 5/16* (2013.01); *B32B 5/26* (2013.01); *B32B 5/30* (2013.01); *B32B 7/05* (2019.01); *B32B 7/12* (2013.01);
(Continued)

(58) Field of Classification Search
CPC ... E01C 5/00; E01C 5/008; E01C 5/08; E01C 5/20; E01C 9/002; E01C 9/08; E01C 13/04; E01C 13/008; E01C 13/08; E01C 13/20
See application file for complete search history.

(56) References Cited

U.S. PATENT DOCUMENTS 2,196,807 A 4/1940 Eckert
2,932,596 A 4/1960 Rayner
(Continued)

FOREIGN PATENT DOCUMENTS

CA 1143532 A 3/1983
CA 2 816 461 A1 5/2006
(Continued)

OTHER PUBLICATIONS

European Search Report dated Mar. 12, 2015, issued in EP Application No. 14 19 2116.
(Continued)

*Primary Examiner* — Babajide A Demuren
(74) *Attorney, Agent, or Firm* — Womble Bond Dickinson (US) LLP

(57) ABSTRACT

A reinforced water-resistant board includes a cover board with a reinforced water-resistant membrane applied to a surface of the cover board. The reinforced water-resistant membrane includes a primer layer, a reinforced membrane, a traffic coat, and a sealing layer. The primer layer is applied over the surface of the cover board. The reinforced membrane includes fleece soaked in a liquid resin and is applied over the primer layer. The traffic coat is bonded to the reinforced member. The sealing layer is applied over the traffic coat.

20 Claims, 10 Drawing Sheets

Related U.S. Application Data is a division of application No. 14/074,909, filed on Nov. 8, 2013, now Pat. No. 9,267,285.

(60) Provisional application No. 62/471,466, filed on Mar. 15, 2017, provisional application No. 62/444,430, filed on Jan. 10, 2017.

(51) Int. Cl.

| | | |
|---|---|---|
| E04C 2/24 | (2006.01) | |
| E04C 2/22 | (2006.01) | |
| E04C 2/16 | (2006.01) | |
| B32B 37/24 | (2006.01) | |
| E04C 2/52 | (2006.01) | |
| E04C 2/26 | (2006.01) | |
| E04C 2/00 | (2006.01) | |
| B32B 3/06 | (2006.01) | |
| B32B 21/10 | (2006.01) | |
| B32B 13/14 | (2006.01) | |
| B32B 7/12 | (2006.01) | |
| B32B 5/30 | (2006.01) | |
| B32B 5/16 | (2006.01) | |
| B32B 5/02 | (2006.01) | |
| E04B 5/02 | (2006.01) | |
| B32B 5/12 | (2006.01) | |
| B32B 5/26 | (2006.01) | |
| B32B 13/04 | (2006.01) | |
| B32B 13/12 | (2006.01) | |
| B32B 21/08 | (2006.01) | |
| B32B 21/14 | (2006.01) | |
| B32B 27/06 | (2006.01) | |
| B32B 27/08 | (2006.01) | |
| B32B 27/12 | (2006.01) | |
| B32B 27/14 | (2006.01) | |
| B32B 27/30 | (2006.01) | |
| B32B 27/36 | (2006.01) | |
| B32B 27/40 | (2006.01) | |
| B32B 3/02 | (2006.01) | |
| B32B 3/30 | (2006.01) | |
| B32B 7/05 | (2019.01) | |

(52) U.S. Cl.
CPC ........... *B32B 13/047* (2013.01); *B32B 13/12* (2013.01); *B32B 13/14* (2013.01); *B32B 21/08* (2013.01); *B32B 21/10* (2013.01); *B32B 21/14* (2013.01); *B32B 27/06* (2013.01); *B32B 27/08* (2013.01); *B32B 27/12* (2013.01); *B32B 27/14* (2013.01); *B32B 27/308* (2013.01); *B32B 27/36* (2013.01); *B32B 27/40* (2013.01); *B32B 37/24* (2013.01); *E04B 1/66* (2013.01); *E04C 2/00* (2013.01); *E04C 2/16* (2013.01); *E04C 2/22* (2013.01); *E04C 2/24* (2013.01); *E04C 2/246* (2013.01); *E04C 2/26* (2013.01); *E04C 2/34* (2013.01); *E04C 2/50* (2013.01); *E04C 2/528* (2013.01); *B32B 2037/243* (2013.01); *B32B 2255/02* (2013.01); *B32B 2255/04* (2013.01); *B32B 2255/08* (2013.01); *B32B 2255/26* (2013.01); *B32B 2260/021* (2013.01); *B32B 2260/023* (2013.01); *B32B 2260/025* (2013.01); *B32B 2260/046* (2013.01); *B32B 2262/0276* (2013.01); *B32B 2262/062* (2013.01); *B32B 2262/101* (2013.01); *B32B 2264/102* (2013.01); *B32B 2305/18* (2013.01); *B32B 2305/20* (2013.01); *B32B 2307/402* (2013.01); *B32B 2307/406* (2013.01); *B32B 2307/712* (2013.01); *B32B 2307/7265* (2013.01); *B32B 2307/732* (2013.01); *B32B 2419/00* (2013.01); *Y10T 428/23914* (2015.04); *Y10T 428/2443* (2015.01)

(56) References Cited

U.S. PATENT DOCUMENTS

| | | |
|---|---|---|
| 3,503,831 A | 3/1970 | Oyama |
| 3,729,368 A | 4/1973 | Ingham et al. |
| 4,063,395 A | 12/1977 | Stewart et al. |
| 4,469,731 A | 9/1984 | Saracino |
| 4,492,064 A | 1/1985 | Bynoe |
| 4,706,435 A | 11/1987 | Stewart |
| 4,959,250 A | 9/1990 | McKinnon |
| 6,516,580 B1 | 2/2003 | Maietta |
| 7,267,735 B2 | 9/2007 | Chang |
| 7,607,271 B2 | 10/2009 | Griffin et al. |
| 7,658,040 B2 | 2/2010 | Bennett et al. |
| 7,718,253 B2 | 5/2010 | Griffin et al. |
| 8,635,825 B2 * | 1/2014 | Bacon ............... E04D 1/12 156/304.3 |
| 9,719,247 B2 | 8/2017 | Tauferner |
| 2002/0100231 A1 | 8/2002 | Miller et al. |
| 2002/0189185 A1 | 12/2002 | Hunter |
| 2003/0054127 A1 | 3/2003 | Heifetz |
| 2003/0129899 A1 | 7/2003 | Fields |
| 2006/0016142 A1 | 1/2006 | Wells |
| 2007/0087166 A1 | 4/2007 | Lee et al. |
| 2008/0245007 A1 | 10/2008 | McDonald |
| 2009/0308001 A1 | 12/2009 | Wu |
| 2010/0068499 A1 | 3/2010 | Kanagawa et al. |
| 2010/0189977 A1 | 7/2010 | Griffin et al. |
| 2011/0131901 A1 | 6/2011 | Pervan et al. |
| 2011/0203218 A1 | 8/2011 | Solov et al. |
| 2011/0223410 A1 | 9/2011 | Gencer et al. |
| 2012/0247042 A1 | 10/2012 | Clancy et al. |
| 2013/0232899 A1 * | 9/2013 | Bacon ............... E04D 1/12 52/309.1 |
| 2014/0099496 A1 | 4/2014 | Attard |
| 2014/0234565 A1 | 8/2014 | Schlueter |
| 2014/0272404 A1 | 9/2014 | Shake et al. |

FOREIGN PATENT DOCUMENTS

| | | |
|---|---|---|
| CN | 202954530 U | 5/2013 |
| CN | 103448122 A | 12/2013 |
| DE | 102011101462 A1 | 11/2011 |
| DE | 202012101988 U1 | 7/2012 |
| EP | 2871053 A1 | 5/2015 |
| JP | 2002061344 A | 2/2002 |
| WO | 0047401 A1 | 8/2000 |
| WO | 2005072957 A1 | 8/2005 |
| WO | 2012078664 A1 | 6/2012 |

OTHER PUBLICATIONS

European Office Action dated Apr. 15, 2016, issued in EP Application No. 14 192 116.3.
European Search Report dated Jun. 8, 2018 in EP Appln. No. 18150900.

* cited by examiner

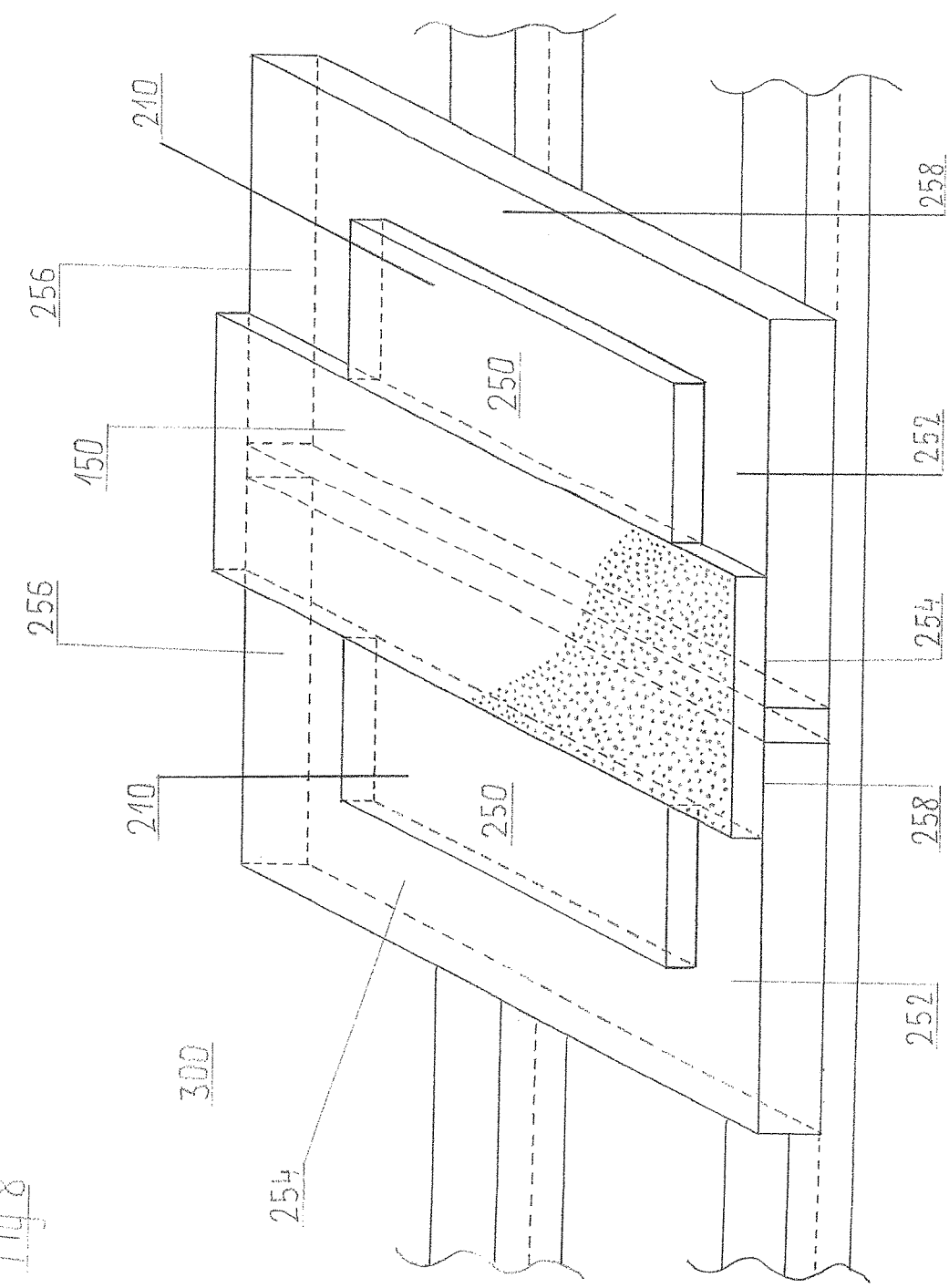

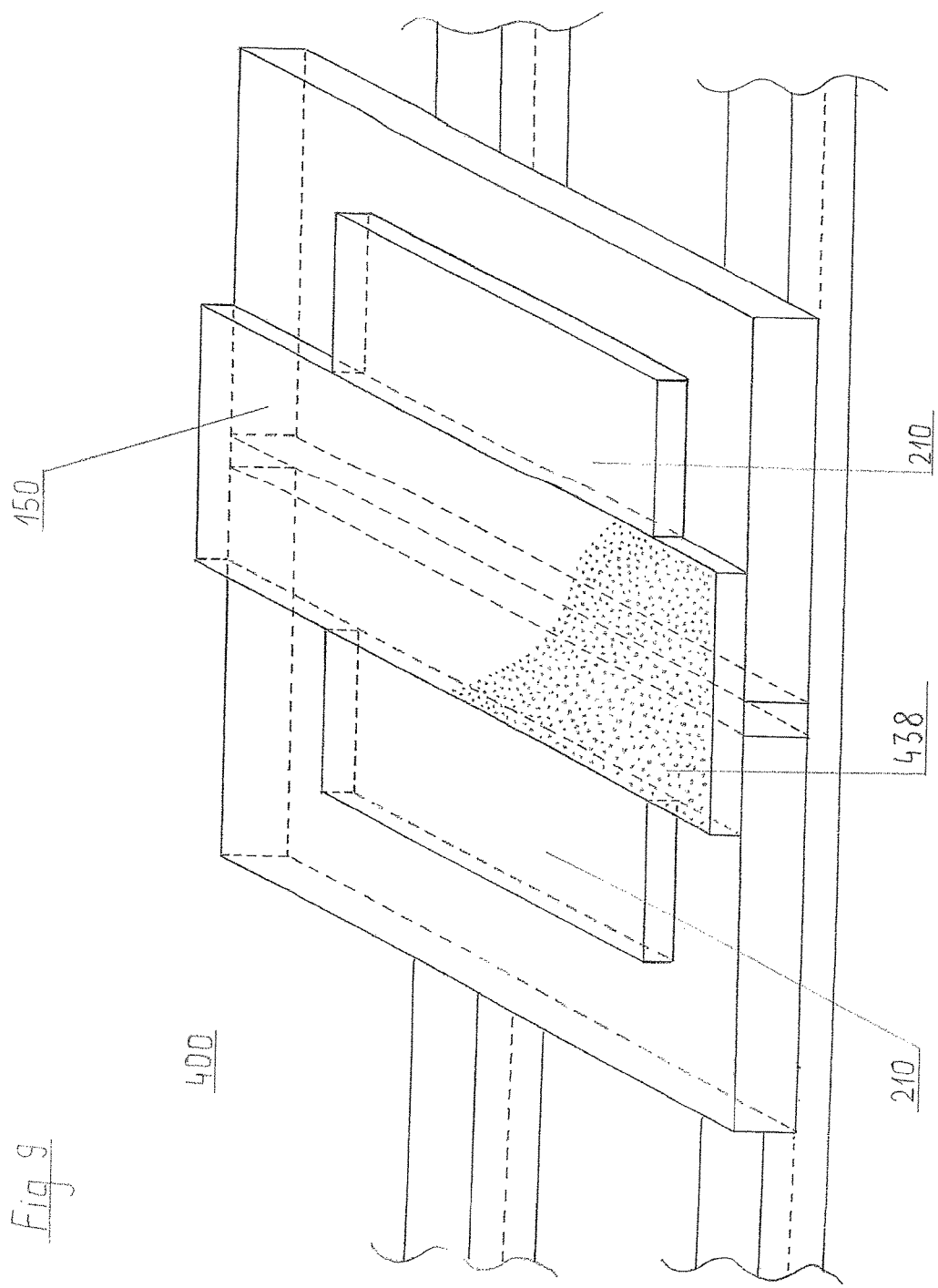

REINFORCED WATER-RESISTANT BOARD WITH TRAFFIC COAT

CROSS-REFERENCE TO RELATED APPLICATIONS

This application is a continuation-in-part of U.S. patent application Ser. No. 15/044,376, filed Feb. 16, 2016, which is a divisional application of U.S. patent application Ser. No. 14/074,909, filed Nov. 8, 2013, now U.S. Pat. No. 9,267,285. In addition, this application claims the benefit of, and priority to, U.S. Provisional Patent Application Ser. Nos. 62/444,430, filed Jan. 10, 2017, and 62/471,466, filed Mar. 15, 2017. The entire contents of each of the above disclosures are hereby incorporated by reference.

BACKGROUND

1. Technical Field

The present disclosure relates to construction materials and, more specifically, to a construction board with a pre-applied water-resistant coating.

2. Background

Water-resistant describes objects relatively unaffected by water or resisting the ingress of water under specified conditions. "Water-resistant" often refers to penetration of liquid water. In construction, a building or structure is made water-resistant with the use of membranes and coatings to protect contents underneath or within as well as protecting structural integrity. Water-resistance is not limited to roofing. Moreover, roofing does not necessarily mean that it is water-resistant.

In commercial, residential, and industrial constructions and buildings, the conventional system of water-resistance involves "membranes." This relies on the application of one or more layers of membrane (available in various materials: e.g., bitumen, silicate, polyvinyl chloride (PVC), ethylene propylene diene monomer (EPDM), etc.) that act as a barrier between the water and the applicable spaces, preventing the passage of water. However, the membrane system relies on exacting application, presenting many difficulties such as problems with application and adherence to the substrate can lead to leakage.

In general, application of a conventional membrane system is a step by step processes; both in terms of manufacturing and application in the field, e.g., on a roof. One or more layers of membrane systems are separately manufactured and separately and successively applied to a surface. The application generally requires application in accordance with instructions and specification provided by a manufacturer, qualified and/or experienced installers, and favorable weather conditions for work at the installation site. Further, once completed, installation of an overboard (such as wood decks, pavers, titles, etc.) is required to protect the membrane from punctures and allow foot traffic.

Application of membrane systems requires favorable atmospheric conditions with respect to precipitation and temperature. For this reason, it may be difficult to apply membrane systems in different regions of the world. For example, most primers cannot be applied in conditions below 32° F. or higher than 90° F. and most liquid resins cannot be applied in conditions below 40° F. or higher than 90° F. In some regions, this can reduce the roofing or waterproofing season to roughly 7 months out of the year. Temperatures, precipitation, moisture, and humidity are all factors for work out in the field. The weather conditions affect the curing times as well.

Further, application of separately and successively applied layers generally involves 5 or 6 steps with approximate curing times varying any time from 30 minutes to 8 or more hours for each step depending on instructions and specifications provided by the manufacture and weather conditions. Weather conditions can be variable throughout the application and curing process that may cover a time in a range of about 3 hours to 88 or more hours for the entire application and curing processes.

With respect to different regions, in the United States weather conditions vary state by state and coast to coast such that exterior work or roofing seasons may be shortened specifically because of the weather conditions. In Germany, the climate is varied with respect to the temperature throughout the country; however, extreme temperature lows and highs are rare. Specifically, in Germany winter temperatures vary from west to east, with around freezing temperatures in the west and well below freezing in the east. Further, in Germany, summer temperatures range between 20° C. and 30° C., with more rainfall during the summer months. Frequent changes of weather can make weather forecasting difficult. In the United Kingdom, the spectrum of weather conditions includes frequent and regular rainy seasons.

With respect to installers, qualified and/or experienced installers are harder to find due to various factors including increasing costs of labor and insurance costs, projects being extended or delayed. The experience of the installers can also affect the likelihood of accidents and defects that may increase manufacturer warranty claims.

SUMMARY

In an aspect of the present disclosure, a reinforced water-resistant board includes a substrate, a primer layer, a reinforced membrane, a traffic coat, and a sealing layer. The primer layer is applied over a surface of the substrate. The reinforced membrane is applied over the primer layer and includes a liquid resin absorbed in fleece. The traffic coat is applied over and bonded to the reinforced membrane. The sealing layer is applied over the traffic coat. In embodiments, the substrate includes a key protruding from a first edge and defines a keyway in a second edge.

In aspects of the present disclosure, a method of manufacturing a reinforced water-resistant board includes forming a reinforced membrane including soaking fleece in a liquid resin, applying the reinforced membrane over the surface of a substrate, and spreading a traffic coat over the reinforced membrane before the liquid resin cures. The method may include applying a primer layer to a surface of a substrate and curing the primer layer. The reinforced membrane may be applied over the cured primer layer. The method may include applying a sealing layer over the traffic coat. In embodiments, the method includes permitting the reinforced membrane to cure before applying a sealing layer over the traffic coat.

In aspects of the present disclosure, applying the reinforced membrane includes spreading the liquid resin over the primer layer and laying the fleece over the liquid resin spread over the primer layer. Applying the reinforced membrane may include rolling the fleece to remove air bubbles from the reinforced membrane. Forming the reinforced membrane may include spreading additional liquid resin over the reinforced membrane over the fleece laid over the liquid resin.

In aspects of the present disclosure, a water-resistant system includes a plurality of reinforced water-resistant boards and a joint sealing system. Each of the plurality of reinforced water-resistant boards may be any of the reinforced water-resistant boards described herein. The joint sealing system is applied over the joints between each of the plurality of reinforced water-resistant boards. The joint sealing system includes a sealing compound placed in each of the joints and a sealing strip laid over each of the joints.

In aspects of the present disclosure, a method of installing a water-resistant system includes securing a first water-resistant board to a first structural member, securing a second water-resistant board to a second structural member, and applying a sealing strip over a first joint to seal the first joint. The first water-resistant board has a first edge and the second water-resistant has a second edge that is adjacent the first edge of the first water-resistant board when the second water-resistant board is secured to the second structural member. The first joint is formed between the first and second edges.

In aspects, the method includes securing the second water-resistant board to the first structural member.

In some aspects, the method includes applying a sealing compound to the first joint before applying the sealing strip over the first joint. The sealing strip may be applied over the sealing compound.

In certain aspects, securing the first water-resistant board includes driving a fastener through the first waste resistant board adjacent the first edge into the first structural member. Applying the sealing strip over the first join may include applying the sealing strip over the fastener.

In particular aspects, applying the sealing strip over the first joint includes applying the sealing strip in a first recess that is formed adjacent the first edge of the first board and a second recess that is formed adjacent the second edge of the second board such that the sealing strip is seamless with central regions of the first and second boards.

In aspects, applying the sealing strip over the first joint includes visually distinguishing recesses of the first and second boards adjacent first joint and applying the sealing strip over the recesses. Visually distinguishing the recesses of the first and second boards includes visually distinguishing a color of the recess from a color of the central regions of the first and second boards.

In some aspects, applying the sealing strip over the first joint includes tactically distinguishing recess of the first and second boards adjacent the first joint and applying the sealing strip over the recesses.

In certain aspects, the method includes applying a water resistant membrane adjacent the first water-resistant board such that a second joint is formed between the first water-resistant board and the water-resistant membrane. The method may include applying a second sealing strip over the second joint between the first water resistant board and the water-resistant membrane. Applying the water-resistant membrane includes applying the water-resistant membrane over the second joint to form a seal between the first water-resistant board and the water-resistant membrane.

In another aspect of the present disclosure, a reinforced water-resistant board includes a substrate, a primer layer, and a reinforced membrane. The substrate has an outside surface and an inside surface opposite the outside surface. The primer layer is applied over the outside surface of the substrate. The reinforced membrane is applied over the primer layer and includes a liquid resin that is absorbed in a first fleece. The liquid resin includes at least one of one-component polyurethane base coat, a one-component aromatic polyurethane base coat, a two-component fast-curing polyurethane base coat, and a cold-applied liquid polyurethane resin.

In aspects, the board includes a traffic coat that is applied over and boded to the reinforced membrane. The traffic coat may be silica sand.

In some aspects, the first fleece absorbs a portion of the primer layer.

In certain aspects, the outside surface has a central region that includes the reinforced membrane and at least one recess adjacent an edge of the outside surface in which the primer layer is exposed. The at least one recess may be visually or tactically distinguishable from the central region. The reinforced membrane may include a second fleece that is laid over the primer layer such that the second fleece absorbs a portion of the primer layer. The first fleece may be applied over the second fleece. The additional primer may be absorbed by the second fleece and the first fleece to bond the first and second fleece to one another.

In another aspect of the present disclosure, a water-resistant system includes a plurality of reinforced water-resistant boards and a joint sealing system. The plurality of reinforced water-resistant boards are attached to a structural member adjacent to one another to cover a structure to be made water-resistant. Each of the plurality of reinforced water-resistant boards includes a substrate and a water-resistant membrane applied to the substrate. The joint sealing system is applied to joints between each of the plurality of reinforced water-resistant boards. The joint sealing system includes a sealing strip that is applied to a joint formed between edges of adjacent reinforced water-resistant boards.

In aspects, the water resistant membrane includes a primer layer, a reinforced membrane, a traffic coat, and a sealing layer. The primer layer may be applied over at least one surface of the substrate. The reinforced membrane may be applied over the primer layer. The reinforced membrane may include a liquid resin absorbed in fleece. The traffic coat may be applied over and boned to the reinforced membrane. The sealing layer may be applied over the traffic coat.

In some aspects, the joint sealing system further includes a sealing compound placed in each of the joints. The sealing trip may be about 4 inches wide.

In certain aspects, the sealing strip includes a reinforced membrane that is applied over the joint. The reinforced membrane may include a liquid resin absorbed in fleece. The sealing strip may include a traffic coat applied over and boned to the reinforced membrane. The sealing strip may include a sealing layer applied over the traffic coat.

In particular aspects of the present disclosure, the substrate of each of the plurality of reinforced water-resistant boards includes a key that protrudes from a first edge and a keyway defined in a second edge. The key of one of the plurality of reinforced water-resistant boards may be received in a keyway of an adjacent one of the plurality of reinforced water-resistant boards.

In another aspect of the present disclosure, a method of installing a water-resistant system includes securing a first water-resistant board to a structural member and securing a second water-resistant board to the structural member, and applying a joint sealing system to a joint between the first and second water-resistant boards by applying a reinforced membrane to the joint. The first water-resistant board may include a substrate and a water-resistant membrane secured to the substrate. The first water-resistant board has a first edge. The second water-resistant board having a second edge that is parallel to and adjacent the first edge of the first water-resistant board such that the joint is formed between the first and second edges. The second water-resistant board includes a substrate and a water-resistant membrane secured to the substrate.

In aspects, applying the reinforced membrane to the joint includes bonding a traffic coat to the reinforced membrane. Applying the reinforced membrane may include applying a sealing layer over the traffic coat.

By prefabricating the reinforced water-resistant boards, the application of the water-resistant systems may be simplified. For example, the prefabricated boards may be used without the need for using torches or kettles to heat a water-resistant membrane or material in the field. Moreover, by prefabricating the reinforced water-resistant boards, in a factory within a controlled environment the adhesion of the water-resistant membrane to the substrate may be more consistent and less prone to defects than a water-resistant membrane applied in the field. The prefabricated reinforced water-resistant board may have a longer life cycle and may be universally used in a variety of applications including but not limited to flat roofs, sloped roofs, balconies, patios, basements, exterior walls, interior walls, floors, etc. In addition, the use of prefabricated reinforced water-resistant boards may reduce the amount of time and activities are required to install the boards decreasing the likelihood of accidents and defects during the installation of the water-resistant systems. Further, using prefabricated reinforced water-resistant boards may decrease the delays in installing a water-resistant system due to weather or environmental conditions, e.g., curing times, humidity, sun exposure, etc. The prefabricated reinforced water-resistant boards may also reduce the need for temporary water-resistant system to be installed before the final water-resistant system is available, e.g., temporary roof By not requiring the use of an over-material, e.g., shingles, tiles, decking, the water-resistant boards may provide a lighter weight water-resistant solution, which may reduce the needed structural support and/or reduce the risk of structural collapses.

Utilizing prefabricated water-resistant boards, the previously 5 or 6 step installation process in the field can be reduced to a 2-step process. The reduction in number of steps may decrease curing times from 8 or more hours to about 30 minutes during the installation of a water-resistant system.

Reducing the amount of time required to install a water-resistant system by using prefabricated reinforced water-resistant boards the labor cost of the installation may be reduced. Moreover, the installation of prefabricated reinforced water-resistant boards may reduce the need for skilled water-proofers and roofers permitting lower skilled laborers to install the water-resistant system.

Additionally, pre-fabricating water-resistant boards may reduce the need for skilled installers allowing lower skilled laborers to install a water-resistant system when reduced to a 2-step process; installing the prefabricated water-resistant boards and applying the joint systems. This may reduce labor costs that also reduces costs associated with worker's compensation, disability, and general liability insurance. Further, the time and the number of steps required to install a water-resistant system can be reduced decreasing the likelihood of accidents, defects, and waste of materials during the installation.

By prefabricating the water-resistant boards in a controlled environment, the adhesion of a membrane system to a substrate may be more consistent and less prone to defects than a water-resistant membrane applied in the field. This may reduce the number of visits of inspectors to an installation site, as well as warranty claims for the manufacturer. The pre-fabricated board with content firmly bonded to the substrate as opposed to the content applied onto the substrate out in the field In summary, prefabrication of the water-resistant boards may reduce construction time, allows for year-round construction, reduce weather delays, ensures precise conformity to code standards and specifications and greater quality assurance during application of membrane systems, reduction of waste materials, reduce potential theft or damage of material and/or equipment at an installation site, reduce exposure of materials to the elements, and increases worker safety and comfort. In addition, computerization of the production process may reduce the cost of customization at an affordable cost, increase quality control, and increase energy efficiency. In addition, computerization may allow for solutions for difficult applications where weather conditions, temperature, and/or moisture do not allow for extended application.

Certain embodiments of the present disclosure may include some, all, or none of the above advantages. One or more other technical advantages may be readily apparent to those skilled in the art for the figures, descriptions, and claims included herein. Moreover, while specific advantages have been enumerated above, various embodiments may include all, some, or none of the enumerated advantages.

Further, to the extent consistent, any of the aspects described herein may be used in conjunction with any or all of the other aspects described herein.

BRIEF DESCRIPTION OF THE DRAWINGS

Various aspects of the present disclosure are described hereinbelow with reference to the drawings, wherein:

FIG. 8, is a top view of another water-resistant system; and

FIG. 9 is a top view of another water-resistant system.

DETAILED DESCRIPTION

Figure 1A:
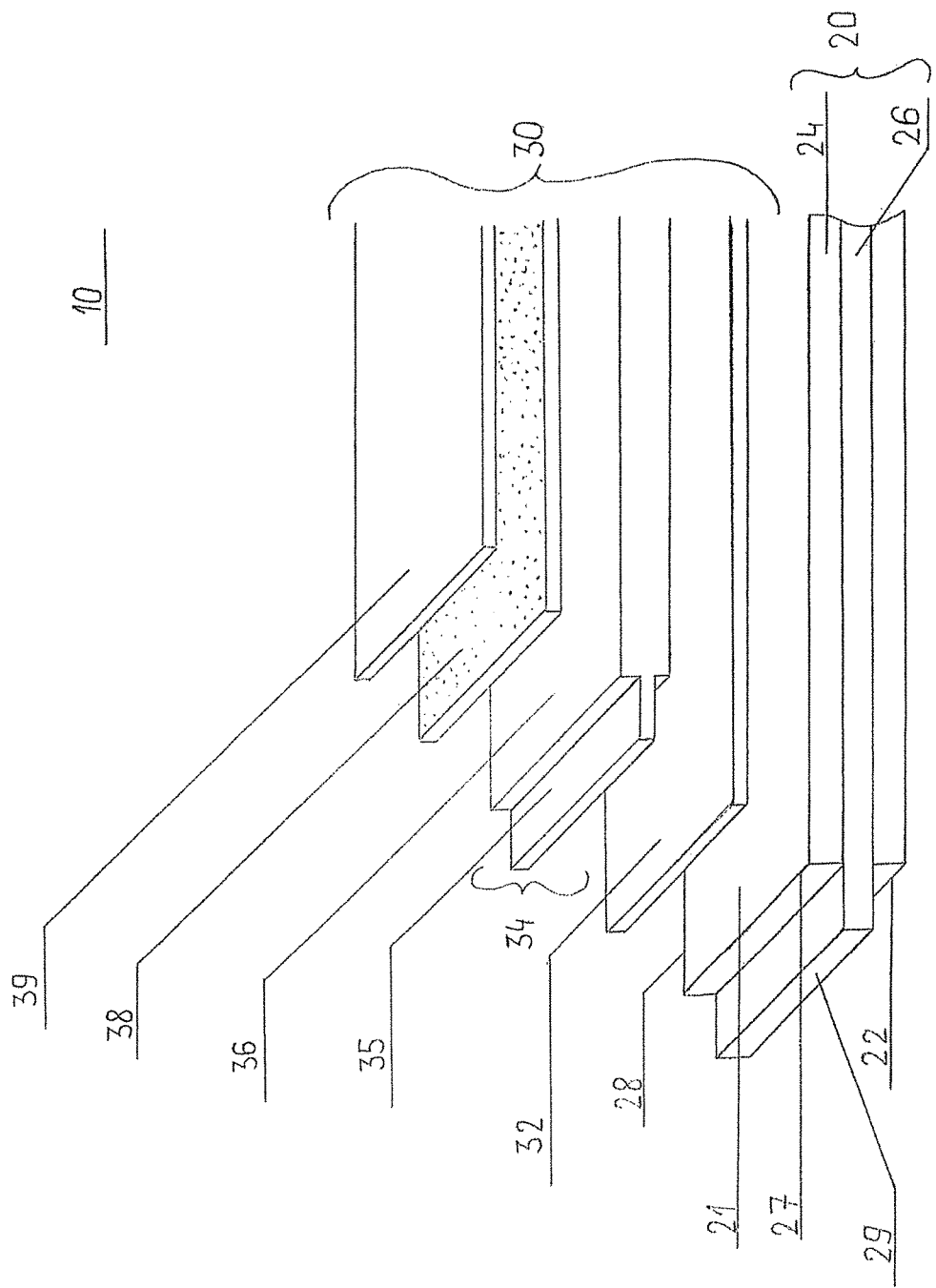
FIG. 1A is an exploded perspective view showing the layers of an exemplary embodiment of a reinforced water-resistant board in accordance with the present disclosure.

This disclosure relates generally to a reinforced water-resistant board with a traffic coat. The reinforced water-resistant board is pre-fabricated and includes a substrate, a primer layer, a reinforced membrane, a traffic coat, and a sealing layer. The primer layer is applied over one or more surfaces of the substrate. The reinforced membrane is applied over the primer layer and includes a liquid resin that is absorbed in fleece. The traffic coat is applied over and bonded to the reinforced membrane. The sealing layer is applied over the traffic coat. In addition, a joint sealing system includes a plurality of reinforced water-resistant boards and a joint sealing system. The joint sealing system includes a sealing strip laid over each of the joints.

Embodiments of the present disclosure are described in detail with reference to the drawings in which like reference numerals designate identical or corresponding elements in each of the several views.

By prefabricating the reinforced water-resistant boards, application of water-resistant systems can be simplified by relocating the liquid membrane application process from an installation site to a controlled factory environment factory. In addition, by applying a joint sealing system to joints between each of the plurality of reinforced water-resistant boards, the pre-fabricated water-resistant boards may create a water-resistant system.

Referring now to FIG. 1A, a reinforced water-resistant board 10 is provided in accordance with the present disclosure including a substrate or cover board 20 and a reinforced water-resistant membrane 30. The reinforced water-resistant membrane 30 includes a primer layer 32, a reinforced membrane 34, a traffic coat 38, and a sealing layer 39.

The reinforced water-resistant board 10 is manufactured by applying the primer layer 32 to a surface 21, 22 of the cover board 20, applying the reinforced membrane 34 over the primer layer 32, applying the traffic coat 38 over the reinforced membrane 34, and applying the sealing layer 39 over the traffic coat 38. As detailed below, the reinforced water-resistant membrane 30 is applied to surface 21 of the cover board 20; however, it is contemplated that the reinforced water-resistant membrane 30 may be applied to both the surface 21 and the surface 22 of the cover board 20. In embodiments, the reinforced water-resistant membrane 30 is applied to surfaces 21 and 22 of the cover board 20 simultaneously. In some embodiments, the reinforced water-resistant membrane 30 is applied to one of the surfaces 21, 22 of the cover board 20 and then to the other one of the surfaces 21, 22 of the cover board 20. Applying the reinforced water-resistant membrane to both of the surfaces 21 and 22 may protect the cover board 20 from moisture penetrating the cover board 20 through either of the surfaces 21, 22.

The cover board 20 may be constructed of any suitable construction material, e.g., a plywood board, a cement board, a blue board, a gypsum board, a fiber board, etc. The cover board 20 may be provided in standard construction lengths and widths, e.g., 8'×4', 8'×6', 5'×3', 4'×4', 12'×2', 12'×26", 8'×26", or in customer sizes. The cover board 20 may be provided in varying thickness in a range of about ⅛" to about 2", e.g., ¼", 3/16", ⅜", ½", 5/16", ⅝", ¾", 1". Two edges of the cover board 20, e.g., an edge 24, may include a keyway 26 and two edges 27, 28 of the cover board 20 may include a key 29. The keyway 26 of one cover board 20 is configured to receive the key 29 of another cover board 20 to interlock adjacent cover boards. The key 29 may extend in a range of about ⅛" to about ½" from the edge 27, 28 of the cover board 20. The key 29 may be substantially centered along an edge 27, 28 of the cover board 20 as shown in FIG. 1A. In embodiments, the key 29 is positioned adjacent a surface 21, 22 along an edge 27, 28 of the cover board 20. The edges 27, 28 may be formed by milling, e.g., using a milling machine, or may be formed manually.

The primer layer 32 is applied to surface 21 of the cover board 20. The primer layer 32 is permitted to cure after being applied to the surface 21. The primer layer 32 may cure in a range of about 1 hour to about 8 hours, e.g., 1, 1.5, 2, 2.5, 3, 3.5, 4, 5, 6, 7, 8 hours, etc.

The reinforced membrane 34 includes fleece 35 that absorbs a liquid resin 36. The reinforced membrane 34 may be applied by applying the liquid resin 36 over the cured primer layer 32, spreading the fleece 35 over the liquid resin 36, and applying additional liquid resin 36 over the fleece 35. A roller (not shown) may be rolled over the fleece 35 and the liquid resin 36 to remove air bubbles from within the reinforced membrane 34. In embodiments, the reinforced membrane 34 may be applied by soaking the fleece 35 in a liquid resin 36 until the fleece 35 absorbs the liquid resin 36. The soaked fleece 35 is laid over the cured primer layer 32. In some embodiments, the reinforced membrane 34 is applied over the cured primer layer 32 by laying the fleece 35 over the cured primer layer 32 and spreading the liquid resin 36 over the fleece 35 until the fleece 35 absorbs the liquid resin 36. When the soaked fleece 35 cures, the soaked fleece 35 forms the reinforced membrane 34. The soaked fleece 35 may cure in the range of about 1 hour to about 8 hours, e.g., 1, 1.5, 2, 2.5, 3, 3.5, 4, 5, 6, 7, 8 hours, etc.

In some embodiments, the reinforced membrane 34 is formed by laying the fleece 35 in uncured primer of the primer layer 32. The fleece 35 may absorb some of the uncured primer. The uncured primer is then permitted to cure such that the fleece 35 is bonded directly to the primer layer 32. After the primer layer 32 is cured, the liquid resin 36 is spread over the fleece 35 such that the fleece 35 absorbs the liquid resin 36. The liquid resin 36 is then permitted to cure such that the fleece 35 and the liquid resin 36 form the reinforced membrane 34. By laying the fleece 35 in the uncured primer, the bond between the fleece 35, and thus the reinforced membrane 34, may be improved. In addition, laying the fleece 35 in the uncured primer may decrease the amount of liquid resin 36 required to soak the fleece 35 in a range of about 30% to about 70%, e.g., about 50%, when compared to laying the fleece 35 on the cured primer. Reducing the amount of liquid resin 36 required to soak the fleece 35 may reduce the cost of the reinforced membrane 34.

Figure 1B:
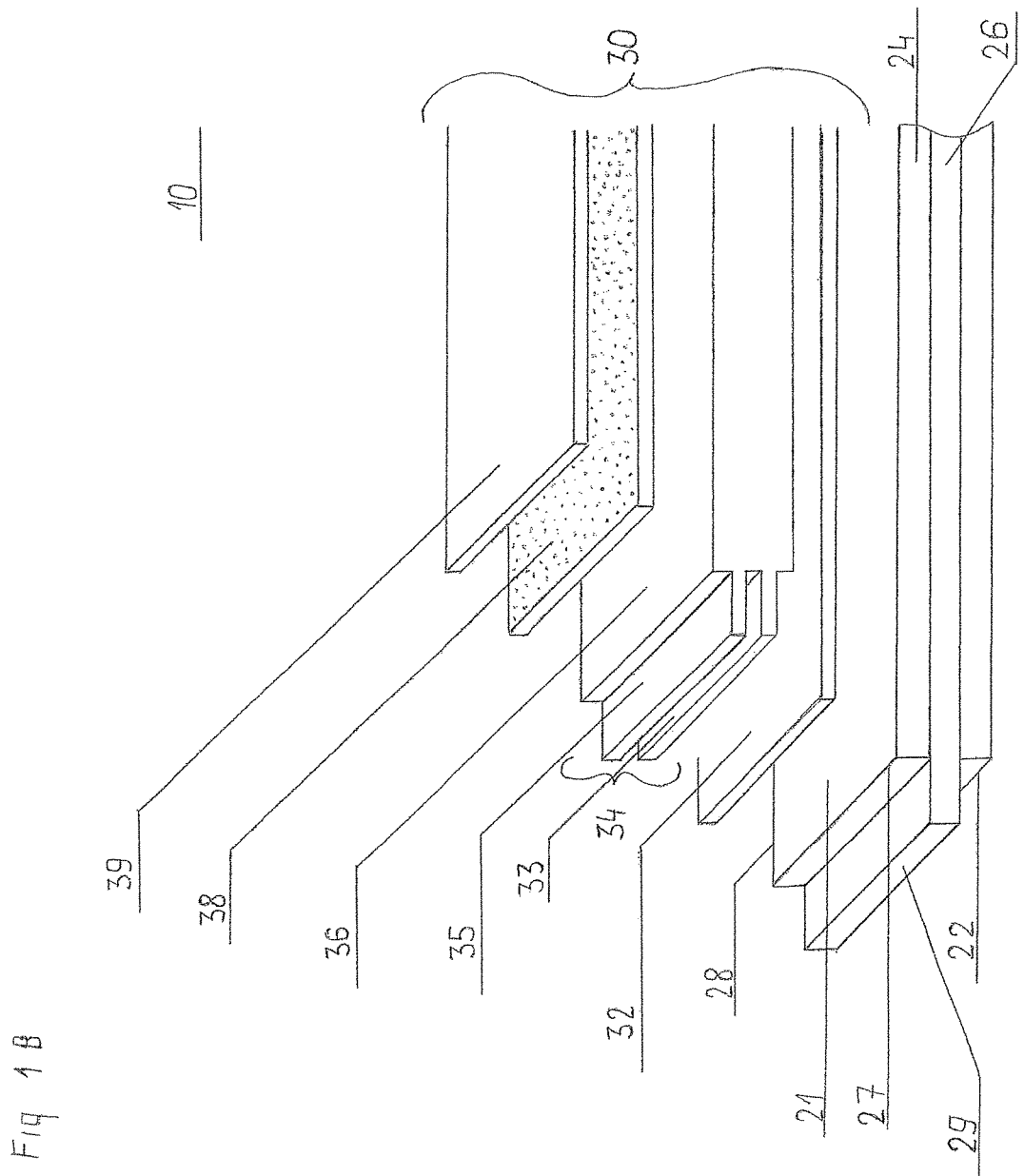
FIG. 1B is an exploded perspective view showing the layers of an exemplary embodiment of a reinforced water-resistant board in accordance with the present disclosure.

With reference to FIG. 1B, the reinforced membrane 34 may include a second fleece 37. Specifically, after the fleece 35 is laid in the uncured primer layer 32, additional primer 33 may be applied to the fleece 35 such that the fleece 35 is soaked in primer. The additional primer 33 may be applied to the fleece 35 before or after the uncured primer layer 32 cures. After the additional primer 33 is applied, the second fleece 37 may be laid over the fleece 35. The second fleece 37 may be laid over the fleece 35 before the additional primer 33 is cured such that the second fleece 37 absorbs a portion of the additional primer 33. After the second fleece 37 is laid over the fleece 35, liquid resin 36 is spread over the second fleece 37 such that the second fleece absorbs the liquid resin 36. The liquid resin 36 may be spread over the second fleece 37 before or after the additional primer 33 cures. The curing of the additional primer 33 may bond the second fleece 37 to the fleece 35. The second fleece 37 may be thicker than the fleece 35; alternatively, the second fleece 37 may be thinner or have the same thickness as the fleece 35. The second fleece 37 may be the same or different material than the fleece 35. Further, the second fleece 37 may have the same length and width of the fleece 35 or may have a width or length less than or greater than the fleece 35. For example, fleece 35 may cover a portion of a surface, e.g., surface 21, 22, of the cover board 20 with a border around the edges of the cover board 20 and the second fleece 37 may cover the entire surface of the cover board 20 and the fleece 35. The border may be in a range of about 1 inch to about 4 inches from each edge. It is contemplated that the fleece 35 may be laid in a first orientation and the second fleece 37 may be laid in a second orientation different from the first orientation, e.g., the second orientation may be perpendicular to the first orientation such that fibers of the second fleece 37 are substantially perpendicular to fibers of the fleece 35.

The traffic coat 38 is spread over the reinforced membrane 34 before the soaked fleece 35 cures. The traffic coat 38 may be dry silica sand or quartz sand spread over the soaked fleece 35. In embodiments, the traffic coat 38 covers the entire surface of the reinforced membrane 34 such that no wet spots of the reinforced membrane 34 are visible. The wet surface of the soaked fleece 35 bonds with the traffic coat 38 as the soaked fleece 35 cures. The traffic coat 38 protects the reinforced membrane 34 from damage. The traffic coat 38 may protect the reinforced membrane 34 from punctures. The traffic coat 38 may allow foot traffic on top of the reinforced member 34 eliminating the need for an over layer such as wood decking, pavers, tiles, shingles, etc.

The sealing layer 39 is applied over the traffic coat 38 after the reinforced membrane 34 cures and bonds with the traffic coat 38. The sealing layer 39 is spread over the traffic coat 38 to prevent liquid penetration into the reinforced membrane 34. The sealing layer 39 is permitted to cure. The sealing layer 39 may cure in the range of about 1 hour to about 4 hours, e.g., 1, 1.5, 2, 2.5, 3, 3.5, 4 hours, etc.

The cover board 20 may include one or more of cement board, plywood, fiberboard, blue board, or composite board. "Cement board" should be understood to include a variety of products including but not limited to one or multi component cement aggregates and reinforcements. "Plywood" should be understood to include a variety of products including but not limited to 1 ply, 3 ply, sanded, unsanded, sheathing, nonsheathing, finished, unfinished, pine, birch, maple, cedar, etc. The following commercially available substrates or cover boards may be used as the cover board 20: WonderBoard® backerboard, Durock® cement board, Project Panels, Hunter panels, Plytanium®, Sopraboard, etc.

The primer layer 32 may include one, two, or multi component epoxy, waterborne epoxy, water-based epoxy, liquid epoxy resins, acrylic, liquid polyurethane resins, liquid methyl methacrylate resin, polymethyl methacrylate (PMMA) primers, thixotropic PMMA resins, catalyzed PMMA primers or coatings, etc. The primer layer 32 may be provided as a liquid. The primer layer 32 may be a cold-applied liquid primer. Suitable primers that may be used to form the primer layer 32 are commercially available from Kemper System, Soprema®, Sika, Behr, siplast®, SEAL-KRETE®, etc. Exemplary materials may be but are not limited to Sikafloor® FTP, Kempertec® D Primer, Kempertec® EP Primer, Kempertec® AC Primer, Kempertec® BSF-R Primer/Sealer, Alsan® RS 222 Primer, Alsan® RS 276 Primer, siplast® Pro Primer R Resin, siplast® Pro Primer W Resin, BEHR PREMIUM® Concrete & Masonry Bonding Primer, etc.

The fleece 35 of the reinforced membrane 34 may include one or more polyester layers, cotton layers, fiberglass fabric layers, reinforced or non-reinforced, coated or non-coated, saturated or non-saturated, non-woven, needle-punched, stitch-bonded, heat-set, or cold process spun. Suitable materials that may be used as the fleece 35 are commercially available from Kemper Systems, Soprema®, siplast®, Sika, etc. Exemplary materials may be but are not limited to Alsan® RS Fleece, Kemperol® Fleece 200, Kemperol® Fleece 165, Kemperol® Fleece AP 120, siplast® Pro Fleece, Sikalastic® Fleece-120, etc.

The liquid resin 36 of the reinforced membrane 34 may include one or more of polyurethane, catalyzed PMMA, PMMA acrylic resin, aliphatic polyurethane, electrometric polyurethane, siliconized elastomeric acrylic, elastomeric acrylic, ceramic elastomeric, acrylic, acrylic latex, methyl methacrylate, polyester, waterborne resins or coatings, etc. any of which may be one, two, or multi-component, fast or slow curing, aromatic or odorless. The liquid resin 36 may be a cold-applied liquid resin. Suitable liquid resins that may be used as the liquid resin 36 are commercially available from Kemper System, Soprema®, Sika, Behr, Henry, siplast®, Gardner-Gibson, SEAL-KRETE®, etc. Exemplary materials may be but are not limited to Alsan® RS 230 Field, Kemperol® 2K-PUR, Kemprol®AC, Kemperol®BR, Kemperol® BRM, Kemprol® V210, Kemperol® V210M, siplase® Parapro Flashing Resin, siplast® Parapro Roof Membrane Resin, Sikalastic®-560, Sikalastic®-710 Base, Sikalastic®-720 Base, Sikalastic®-745AL, Sikalastic®-715 Top, Black Jack® 5530-1-30 (Ultra-Roof 1000), Black Jack® 5227-1-20 (Roof Patch), Black Jack® 5527-1-30 (Roof-Gard 700), Black Jack® 5532-1-30 (Maxx-Cool), Black Jack® 6030-7-20 (Foundation Waterproof Coating), etc.

The traffic coat 38 may be a combination of one or more of resin, fleece, silica sand, and sealer. Suitable sizes for sand used as the traffic coat may be in a range of about −1 to about 4 on the Krumbein Phi Scale. Suitable traffic coats that may be used as the traffic coat 38 are commercially available from Kemper System, Soprema®, Sika, Behr, Henry, Gardner-Gibson, SEAL-KRETE®, siplast®, 3M®, etc. Exemplary materials may be but are not limited to Surfacing Sand #0 from Kemper Systems, 3M Colorquartz®, etc.

Additionally or alternatively, the traffic coat 38 may have cosmetic characteristics. For example, in some embodiments the traffic coat 38 may be in the form of artificial turf, i.e., fake grass, such that the roof appears to be covered with grass. In some embodiments, the traffic coat 38 may be in the form of carpet. It is contemplated that the traffic coat 38 may include a combination of one or more of resin, fleece, silica sand, and sealer and then be covered by a cosmetic layer.

The sealing layer 39 may include one or more of concrete, brick, or roofing sealers including but not limited to polyurethane, aliphatic polyurethane, water-based acrylic, acrylic resin, epoxy, epoxy acrylic, water-based, waterborne, waterborne epoxy, siliconized elastomeric acrylic, elastomeric acrylic, ceramic elastomeric, acrylic latex, methyl methacrylate, silicate, silane siloxane, and polyester sealers or coatings, etc. which may be one, two, or multi component, fast or slow curing, aromatic or odorless, and from glossy to flat finish. The sealing layer 39 may be provided in liquid form. In embodiments, the sealing layer 39 is a cold-applied liquid sealer. Suitable sealers that may be used as the sealing layer 39 are commercially available from Johns Manville, Kemper System, Sika, Behr, Henry, Gardner-Gibson, SEAL-KRETE®, siplast®, etc.

Exemplary materials may be but are not limited to Kemperdur® Eco Finish, Kemperdur® Finish, Kemperdur® Deko Transparent, Kemperdur® FC Floor Coating, Keperdur® EP-FR Finish, Kemperdur® Deko Finish, Kemperdur® BSF-R Finish, Kemperdur® Deko 2KS-FR Finish, Kemperdur® AC Finish, Sikalastic®-745AL, Sikalastic®-715 Top, BEHR PREMIUM® 1 Part Epoxy Concrete Floor Paint, SEAL-KRETE® Original Waterproofing Sealer, SEAL-KRETE® Epoxy Seal Slate Concrete and Garage Floor Paint, Black Jack® 5530-1-30 (Ultra-Roof 1000), Black Jack® 5227-1-20 (Roof Patch), Black Jack® 5527-1-30 (Roof-Gard 700), Black Jack® 532-1-30 (Maxx-Cool), Black Jack® 6030-7-20 (Foundation Waterproof Coating), etc.

It is contemplated that reinforced membrane 34, the traffic coat 38, and/or the sealing layer 39 may be provided in a variety of colors including but not limited to black, gray, white, brown, silver, etc.

As detailed above, the reinforced water-resistant membrane 30 includes a primer layer 32, a reinforced membrane 34, a traffic coat 38, and a sealing layer 39; however, it is contemplated that the reinforced water-resistant membrane 30 may exclude one or more of the layers detailed above. For example, in certain applications the reinforced water-resistant membrane 30 may include a reinforced membrane 34, a traffic coat 38, and a sealing layer 39 excluding the primer layer 32. Additionally or alternatively, the reinforced water-resistant membrane 30 may include a primer layer 32, a reinforced membrane 34, and a traffic coat 38 excluding the sealing layer 39. In addition, it is contemplated the reinforced water-resistant membrane 30 may be formed without a traffic coat 38.

Figure 2:
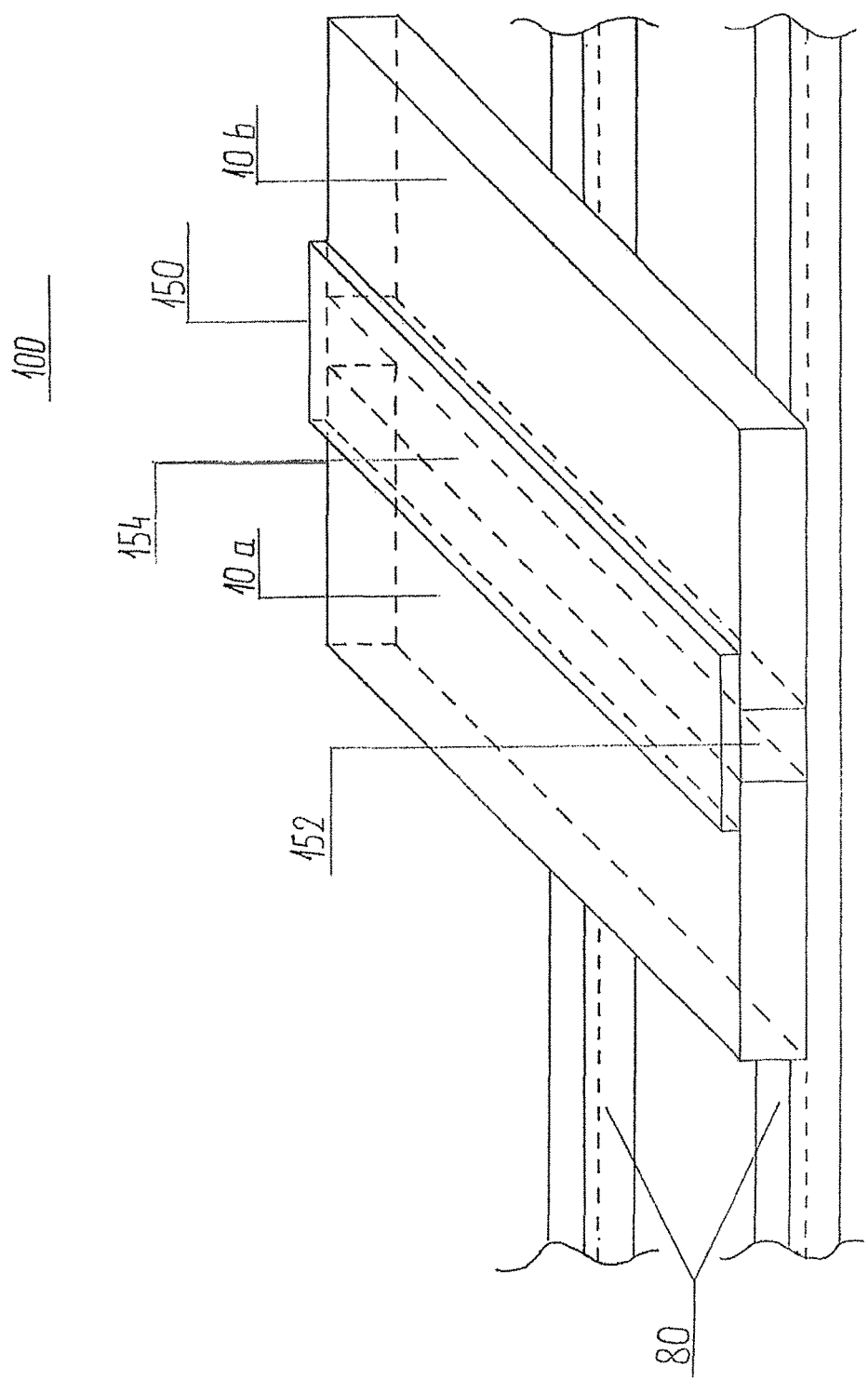
FIG. 2 is a perspective view of an embodiment of a water-resistant system in accordance with the present disclosure including a two reinforced water-resistant boards attached to structural members.
Figure 3:
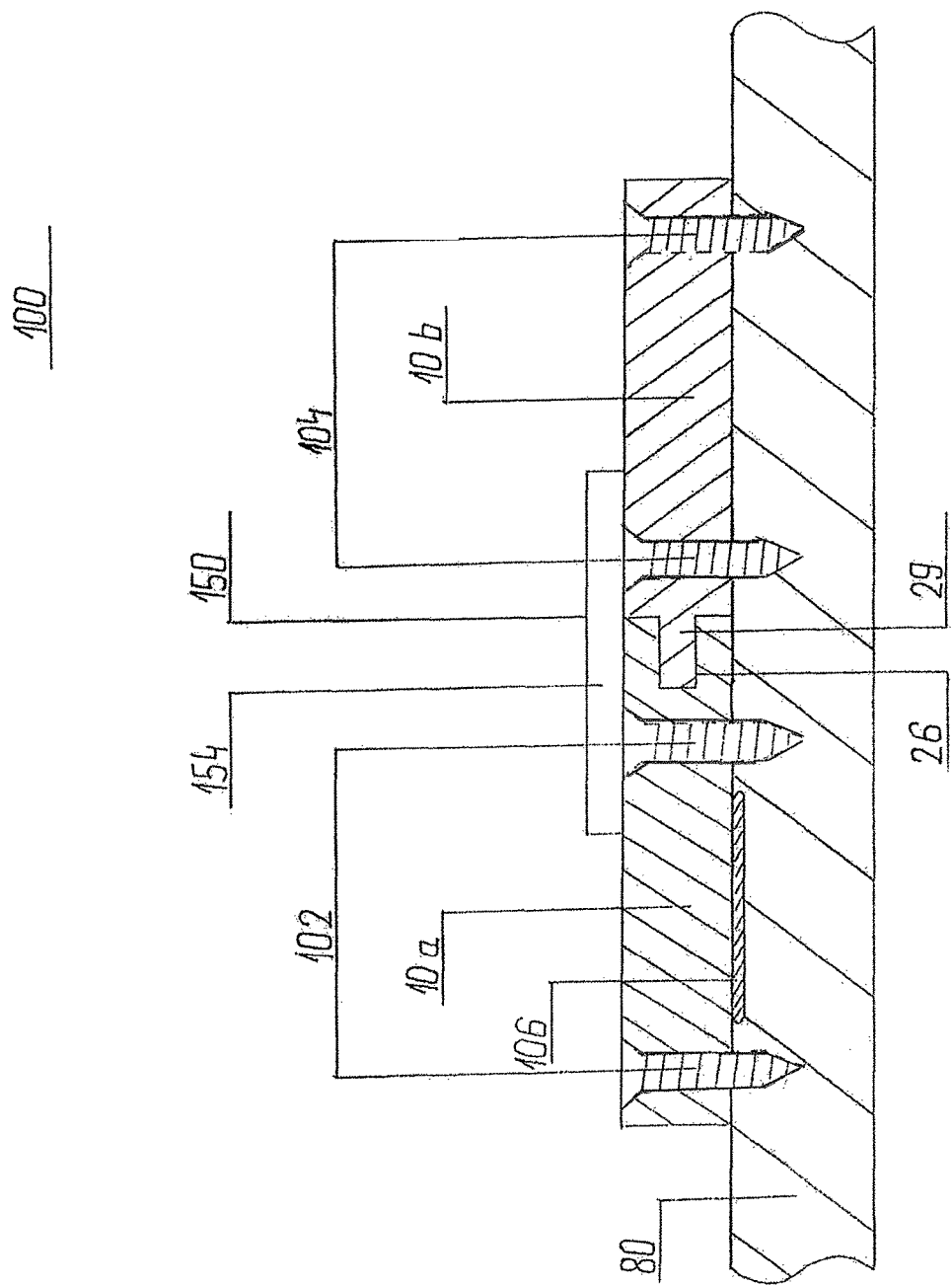
FIG. 3 is a front cross-sectional view of the water-resistant system of FIG. 2 taken along the center line of one of the structural members.
Figure 4:
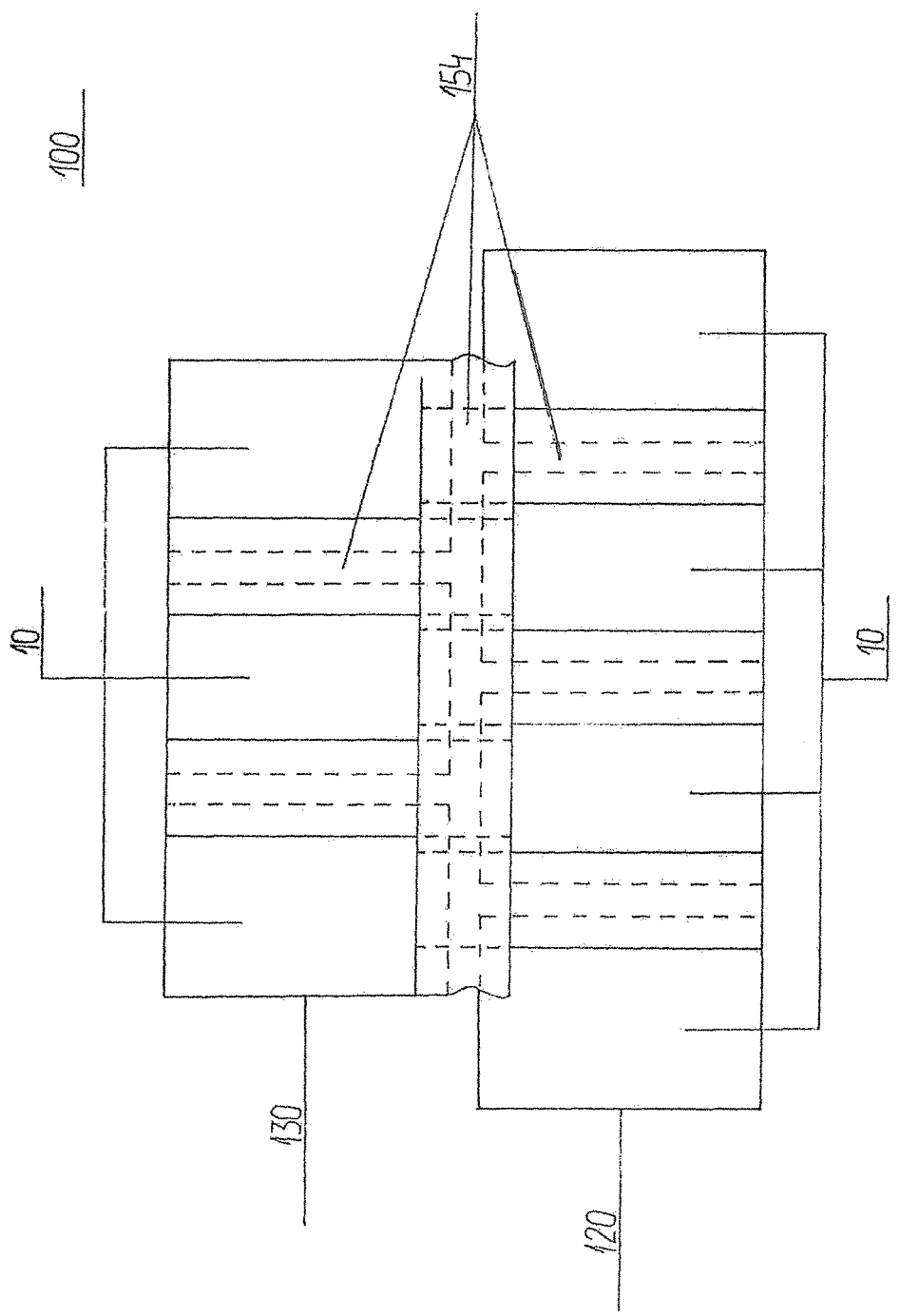
FIG. 4 is a top view of another embodiment of a water-resistant system including a plurality of reinforced water-resistant boards

With reference to FIGS. 2-4, a water-resistant system 100 in accordance with the present disclosure includes a plurality of reinforced water-resistant boards 10 and a joint sealing system 150. The water-resistant system 100 may be used in a variety of applications including but not limited to new roofs (flat and sloping), roof repair, roof recovery, balconies, terraces, patios, decks, basement finishing, exterior walls, interior walls (e.g., bathrooms, kitchens, laundry rooms, utility rooms, etc.), interior floors, etc. Each water-resistant board 10 may include a water-resistant membrane 30 or another water resistant membrane such as a bitumen membrane. Suitable water-resistant membranes are disclosed in U.S. Pat. Nos. 4,706,435; 7,374,816; 7,607,271; 7,267,735; and 9,476,202.

A first board 10a is attached to one or more structural member(s) 80, e.g., rafters, floor boards, joists, framing, etc., of a structure to be made water-resistant, e.g., a floor, a roof, etc. Each board 10 may be attached to the structural member(s) 80 by one or more fastener(s), e.g., nails 102 and screws 104, and/or adhesives 106, e.g., glue stick. As shown in FIG. 3, board 10a is attached to the structural member 80 by a nails 102 and adhesive 106 and board 10b is attached to the structural member 80 by screws 104. The fastener(s) may be driven through the board 10a, 10b and into the structural member 80. A first row of boards 120 is formed by placing a second board 10b adjacent to the first board 10a. Two adjacent boards may be interlocked by inserting a key 29 of the first board 10a into a keyway 25 of the second board 10b. In embodiments, the boards 10 are interlocked by being placed adjacent to one another with a minimum gap between the boards 10a, 10b. The interlocked second board 10b is attached to the structural member(s) 80 in a manner similar to the first board 10a. This process of placing and/or interlocking and attaching boards 10 is continued until the first row of boards 120 is complete. A second row of boards 130 is formed in a similar manner to the first row of boards 120 with the addition of placing and/or interlocking an edge of each board 10 in the second row of boards 130 with an edge of the first row of boards 120. It is also contemplated, that the joints between boards in the second row of boards 130 are offset from the joints between boards in the first row of boards 120 as shown in FIG. 4. Successive rows of boards are added to the water-resistant system 100 until the entire structure is covered by the water-resistant system 100. It is contemplated that portions of boards 10 of the water-resistant system 100 may extend beyond the structural member(s) 80 that the water-resistant is attached. This extension may form an overhang or eave.

The joints between the boards 10 are sealed with the joint sealing system 150. The joint sealing system 150 may include a sealing compound 152 and/or a sealing strip 154. The sealing compound 152 is applied to the joint between the edges of adjacent boards 10a, 10b as shown in FIG. 2. The sealing compound 152 may be a caulking material such as polyurethane caulking, e.g., MP1, Sica, etc. The sealing strip 154 is applied over the joint between two adjacent boards 10a, 10b. The sealing strip 154 may have a width such that the sealing strip 154 covers the top of fasteners, e.g., nails 102, screws 104, driven through adjacent boards 10a, 10b to secure the boards 10a, 10b to the structural member(s) 80. The sealing strip 154 may be a self adhesive, e.g., GacoRoof RoofTape. The joint sealing system 150 seals any gaps between adjacent boards 10a, 10b to provide a continuous water-resistant seal across water-resistant system 100. It is contemplated that the sealing strip 34 may be made similar to the reinforced membrane 30 including fleece and liquid resin, e.g., the fleece 35 and the liquid resin 36. In embodiments, the sealing strip 34 is about 4 inches wide; however, the sealing strip 34 maybe thinner or wider than 4 inches. It is understood that the sealing strip 34 is wide enough to cover the joints between adjacent boards and to cover the tops of the fasteners driven through adjacent boards. It is contemplated that sealing strips 34 may cover the entire surface or surfaces of the water-resistant system 100. It is contemplated that the prefabricated reinforced water-resistant boards may be incorporated into existing water-resistant systems already available on the market such as the Kemper System, the Black Jack® System, the Soprema® System, the siplast® System, etc.

It will be appreciated that the boards 10 of water-resistant system 100 are adjacent and not overlapping that the boards 10 may be laid in any order. For example, a water-resistant system 100 forming a sloped roof may be started by first attaching the boards adjacent to the bottom of the roof, may be started by first attaching the boards forming the peak of the roof, or may be started at any place in the middle of the roof. This allows for flexibility for the construction, which allows areas of the roof to be completed before other portions permitting access to some areas while water-resistant other portions of the structure.

With particular reference to FIG. 3, when multiple boards 10 are used to form the water-resistant system 100, the joint sealing system 150 may create incongruities in an exposed surface of the water-resistant system 100. These incongruities may be distinguished visually or tactilely. For example, when the water-resistant system 100 forms a roof, the incongruities may be visible when observed from the ground or the air such that the water-resistant system 100 may appear to have a "checkerboard" pattern. Alternatively or additionally, in some applications, the incongruities may from ridges that retain water or that impede flow of water in a particular direction.

Figure 5:
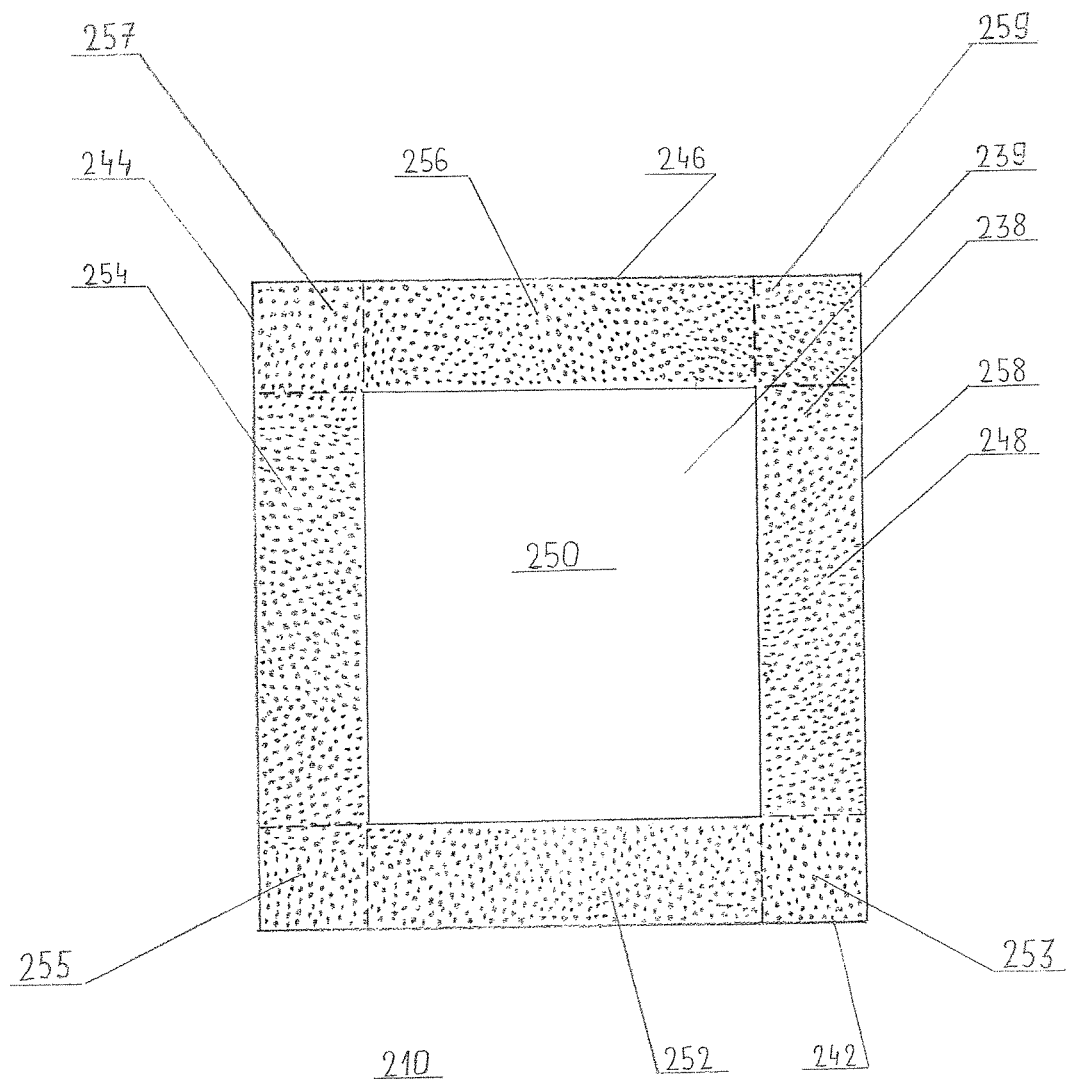
FIG. 5 is a top view of another embodiment of a reinforced water-resistant board in accordance with the present disclosure.
Figure 6:
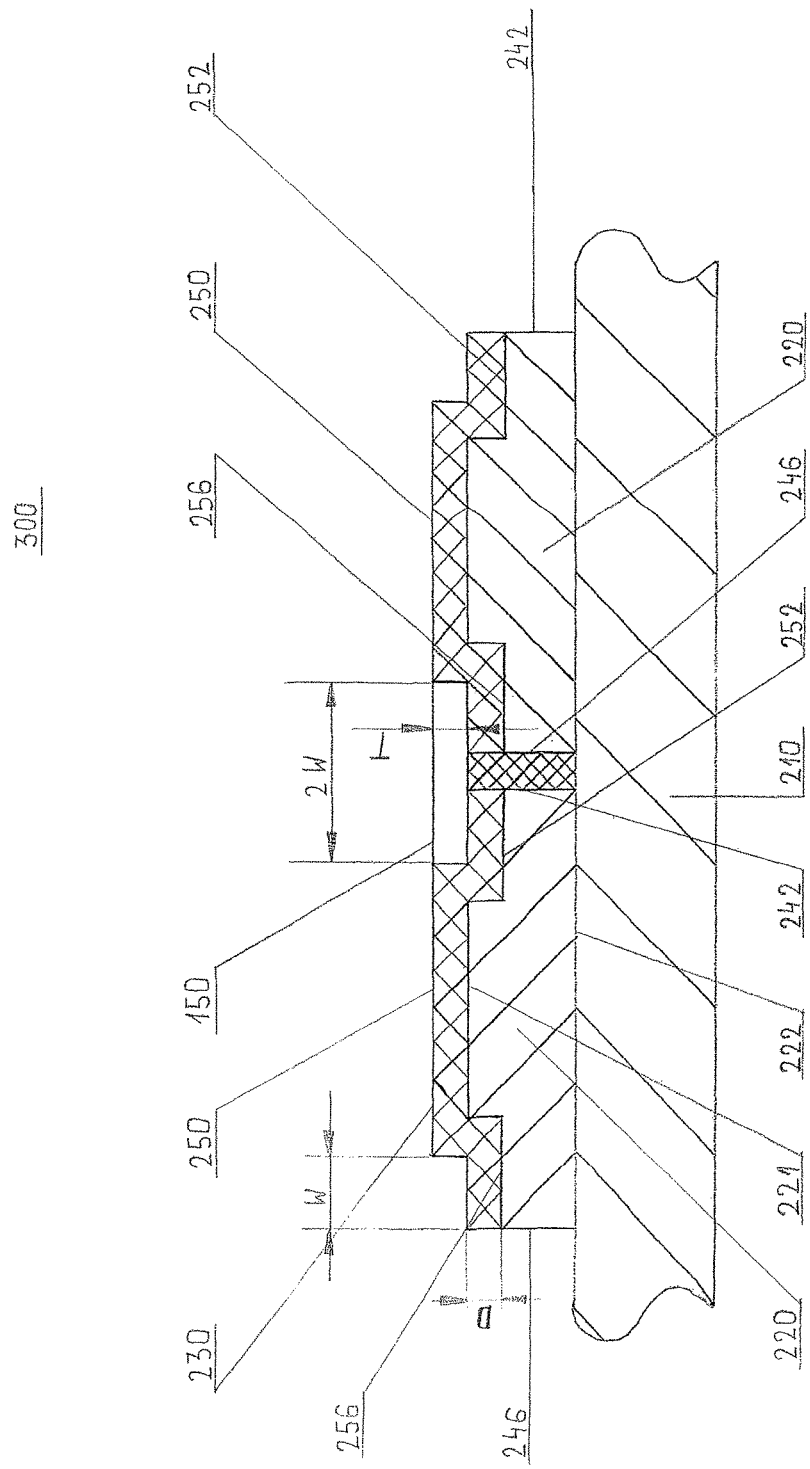
FIG. 6 is a front cross-sectional view of a water-resistant system including two boards of FIG. 5.

Referring to FIGS. 5 and 6, another reinforced water-resistant board 210 is provided in accordance with the present disclosure to reduce incongruities in a completed water-resistant system, e.g., water-resistant system 100 (FIG. 3), such that the water-resistant system is seamless and leveled between individual reinforced water-resistant boards as detailed below. The reinforced water-resistant board 210 is similar to the reinforced water-resistant board 10 detailed above with like elements labeled with a similar label with a "2" preceding the previous label. For brevity, some elements will not be discussed in detail as the elements are substantially similar to the previous elements.

The board 210 includes a substrate 220 and a reinforced water-resistant membrane 230. The substrate 220 has an upper or outer surface 221 and a lower or inner surface 222. As shown, the outer surface 221 has a reinforced water-resistant membrane 230 and the inner surface 222 remains untreated. It is contemplated that in some applications both the outer and inner surfaces 221, 222 may include a membrane 230.

The substrate 220 includes edges 242, 244, 246, 248. The substrate 220 defines a recess 252 in the outer surface 221 that extends from the edge 242 towards a central region 250 of the substrate 220, a recess 254 in the outer surface 221 that extends from the edge 244 towards the central region 250 of the substrate 220, a recess 256 in the outer surface 221 that extends from the edge 246 towards the central region 250 of the substrate 220, and a recess 258 in the outer surface 221 that extends from the edge 248 towards the central region 250 of the substrate 220. The recesses 252, 254, 256, 258 may be formed by milling. Further it is contemplated, that the substrate 220 may be provided as a standalone product such that the reinforced water-resistant membrane 230 can be applied after the milling of the substrate 220. In addition, it is contemplated that the substrate 220 may be provided with a primer layer, e.g., primer layer 32, applied over one or both of the outer surface 221 or the inner surface 222.

With particular reference to FIG. 6, each of the recesses 252, 254, 256, 258 has a depth "D" defined in a direction orthogonal to the respective edge 242, 244, 246, 248 that is substantially equal to a thickness "T" of a joint sealing system 150 used to seal a joint between one or more of the water-resistant boards 210. For example, the depth "D" may be in a range of about 0.0625 inches to about 0.375 inches, e.g., about 0.125 inches or about 0.25 inches. In addition, a width "W" of each of the recesses 252, 254, 256, 258 from the respective edge 242, 244, 246, 248 towards the central region 250 is substantially equal to half the width of the joint sealing system 150 such that when the joint sealing system 150 is applied over a joint between adjacent boards 210 the width "W" of two recesses, e.g., recesses 252, 256, is equal to the width "2W" of the joint sealing system 150. For example, the width "W" may be in a range of about 1 inch to about 4 inches, e.g., about 2.25 inches. It is contemplated that when the joint sealing system 150 has a width of about 4 inches that the width "W" of the recesses 252, 256 may be about 2.25 inches such that the joint sealing system 150 forms a seamless or leveled joint between adjacent boards 210.

It is contemplated that in regions where two recesses 252, 254, 256, 258 overlap one another, i.e., near corners formed by two edges 242, 244, 246, 248, corner regions 253, 255, 257, 259 may be defined having a depth substantially equal to double the depth "D" of a single recess 252, 254, 256, 258. By having a depth substantially equal to double the depth "D" of a single recess 252, 254, 256, 258, the corner regions 253, 255, 257, 259 are sized and dimensioned to receive two joint sealing systems 150.

It is also contemplated that the reinforced water-resistant membrane 230 may vary across a respective surface, e.g., surface 221, of the substrate 220. For example, in the central region 250 of the surface 221 of the substrate 220, the water-resistant membrane 230 may include a primer layer, a reinforced membrane, a traffic coat 238, and a sealing layer 239 and in regions of the surface 221 adjacent the edges 242, 244, 246, 248, e.g., regions over one or more of the recesses 252, 254, 256, 258, the water-resistant membrane 230 may be formed without the sealing layer 239. By not including the sealing layer 239 on portions of the water-resistant membrane 230, adhesion of the joint sealing systems 150 to the boards 220 may be improved. Additionally or alternatively, by not including the sealing layer 239 on portions of the water-resistant membrane 230, incongruities of a completed water-resistant system, e.g., water-resistant system 300, may be reduced or eliminated.

By having a depth "D" and a width "W" as detailed above, the recesses 252, 254, 256, 258 are sized and dimensioned to receive the joint sealing system 150 such that when used in the water-resistant system, e.g., water-resistant system 100, the joint sealing system 150 forms contiguous surface with the membranes 230 of the water-resistant boards 210. By forming a contiguous surface with the joint sealing system 150 and the membranes 230 of the water-resistant boards 210, the incongruities of a completed water-resistant system can be reduced or eliminating such that the water-resistant boards 210 and joint systems 150 are visually and tactilely indistinguishable from one another. Additionally or alternatively, reducing or eliminating the incongruities of a completed water-resistant system, the water-resistance of a completed water-resistant system 300 may be improved.

Figure 7:
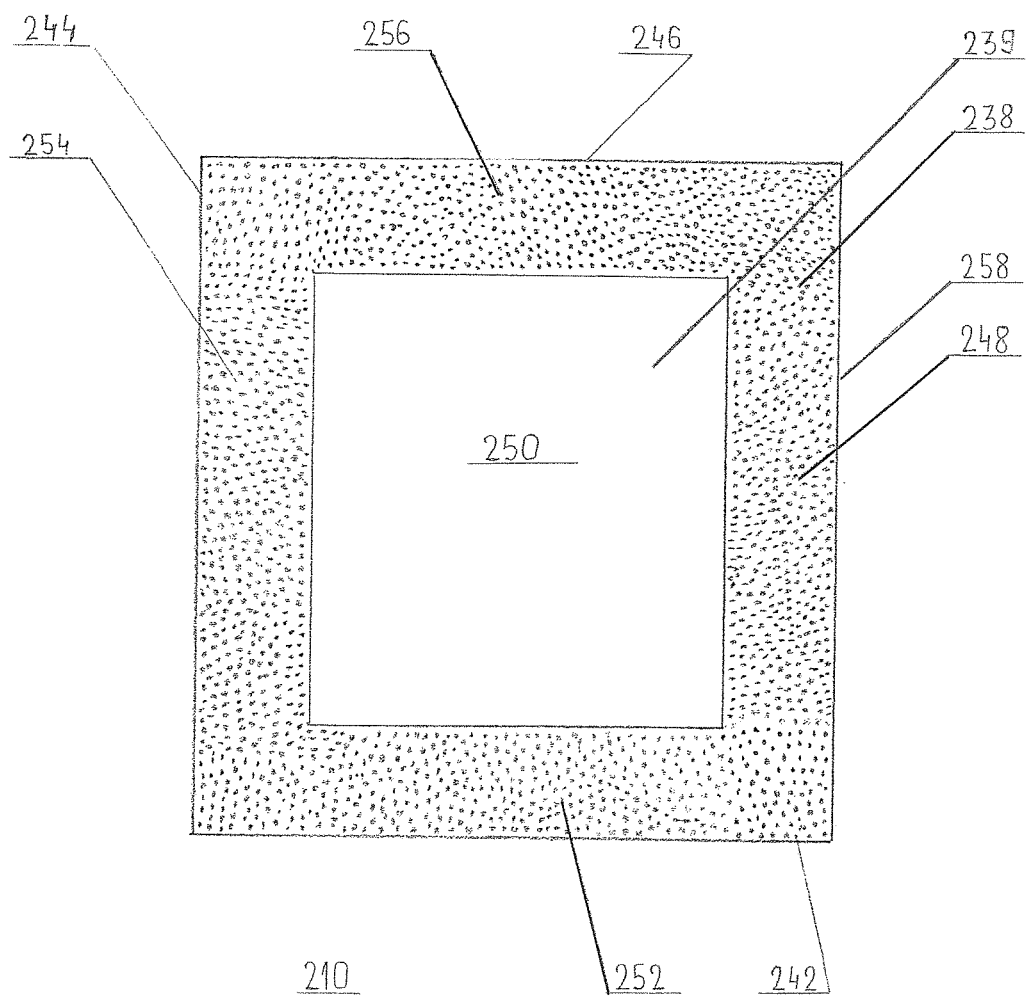
FIG. 7 is a top view of the reinforced water-resistant board of FIG. 5.

With reference to FIG. 7, the water-resistant board 210 is shown with a traffic coat 238 exposed over the recesses 252, 254, 256, 258 and a sealing layer 239 exposed over the central portion 250. It will be appreciated that the color and/or texture of the traffic coat 238 and the sealing layer 250 may be distinct from one another such that an installer can visually or tactilely determine where to apply a joint system, e.g., joint system 150 as detailed below, or if a joint system has been applied in a completed water-resistant system, e.g., water-resistant system 300 as detailed below.

With reference to FIG. 8, a method for installing a water-resistant system 300 is described in accordance with the present disclosure. Initially, two or more water-resistant boards 210 are secured to a structure to form a surface, e.g., a roof. When the water-resistant boards 210 are secured to a structure, the recesses 252, 254, 256, 258 of each of the water-resistant board 210 are adjacent recesses 252, 254, 256, 258 of adjacent water-resistant boards 210. The recesses 252, 254, 256, 258 may have a different color and/or texture from the central region 250 of each of the water-resistant boards 210. For example, the recesses 252, 254, 256, 258 may have an exposed traffic coat, e.g., traffic coat 238 (FIG. 7), and the central region 250 may have the traffic coat sealed by a sealing layer, e.g., sealing layer 239 (FIG. 7).

The joint sealing system 150 is applied over the recesses 252, 254, 256, 258 such that the color and/or the texture of the joint sealing system 150 matches color and/or texture of the central region 250 of the water-resistant boards 210. When the joint sealing system 150 is applied over the recesses 252, 254, 256, 258, the joint sealing system 150 is leveled and seamless with the sealing layer 239 of the central portions 250 of the water-resistant boards 210 such that the entire water-resistant system 300 is leveled and seamless.

Referring to FIG. 9, another method for installing a water-resistant system 400 is described in accordance with the present disclosure. Initially, water-resistant boards, e.g., water-resistant boards 10 or 210, are secured to a structure adjacent one another. With the water-resistant boards 10, 210 are secured to the structure, the joint sealing system 150 is applied over joints between adjacent water-resistant boards 10, 210. Then, a traffic coat 438 is applied over the joint sealing system 150 before the joint sealing system 150 is cured such that the joint sealing system 150 is seamless and leveled with each of the water-resistant boards 10, 210. It will be appreciated that the water-resistant boards 10, 210 of the water-resistant system 400 may have an exposed traffic coat, e.g., traffic coat 38, 238, in the respective central portions.

It is contemplated that the water-resistant systems detailed above, e.g., systems 100, 300, 400, may be part of a larger water-resistant system. Specifically, the water-resistant boards 10, 210 may be used in portions of a water-resistant system that are difficult to form in place due to structures or the shape of the water-resistant system. For example, the water-resistant boards 10, 210 may be used to form a water-resistant system 100, 300, 400 over a specific region of a roof and a water-resistant membrane may be installed in place and integrated with the water-resistant system 100, 300, 400. Specifically, a joint between the water-resistant system 100, 300, 400 and the water-resistant membrane is sealed by applying a joint sealing system, e.g., joint sealing system 150, 250, over the joint between the water-resistant system and the water-resistant membrane. Additionally or alternatively, the water-resistant membrane may be formed over a portion of the water-resistant boards 10, 210 to seal the joint between the water-resistant system and the water-resistant membrane.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope and spirit of the claims appended hereto.

What is claimed:

1. A water-resistant board comprising:
   a substrate including an inside surface and an outside surface opposite the inside surface; the outside surface having a first edge, a second edge, a third edge, and a fourth edge; the first and second edges intersecting at a first corner; the second and third edges intersecting at a second corner; the third and fourth edges intersecting at a third corner; the outside surface having a central region positioned between the first, second, third, and fourth edges; the outside surface defines a first recess that extends from the first edge towards the central region and a second recess that extends from the second edge towards the central region; the outside surface including a first corner recess adjacent the first corner; the first corner recess defined by the first recess, the second recess, the first edge, and the second edge; each of the first and second recesses recessed a first depth from the central region and the first corner recess recessed a second depth from the central region; the second depth being greater than the first depth.

2. The water-resistant board according to claim 1, further comprising a primer layer applied over the central region of the outside surface.

3. The water-resistant board according to claim 2, wherein the primer layer is applied over the first and second recesses and the central region of the outside surface to form a continuous primer layer over the entire outside surface.

4. The water-resistant board according to claim 1, wherein each of the first and second recesses is configured to receive a sealing strip such that the sealing strip forms a contiguous surface with the central region.

5. The water-resistant board according to claim 1, wherein the first corner recess is configured to receive two sealing strips such that the one of the two sealing strips forms a contiguous surface with the central region.

6. The water-resistant board according to claim 1, wherein the first recess is visually distinguishable from the central region.

7. The water-resistant board according to claim 6, wherein the central region has a first color and the first recess has a second color.

8. The water-resistant board according to claim 1, wherein the first recess is tactually distinguishable from the central region.

9. The water-resistant board according to claim 2, further comprising a reinforced membrane applied over the primer layer, the reinforced membrane including a liquid resin absorbed in a first fleece, the liquid resin being selected from the group consisting of: a one-component polyurethane base coat, a one-component aromatic polyurethane base coat, a two-component fast-curing polyurethane base coat, and a cold-applied liquid polyurethane resin.

10. The water-resistant board according to claim 9, further comprising a traffic coat applied over and bonded to the reinforced membrane.

11. A water-resistant system comprising:
    a first water-resistant board including a first substrate including a first inside surface and a first outside surface opposite the first inside surface, the first outside surface of the first water-resistant board having a first edge, the first outside surface defining a first recess that extends from the first edge towards a first central region of the first water-resistant board;
    a second water-resistant board including a second substrate including a second inside surface and a second outside surface opposite the second inside surface, the second outside surface of the second water-resistant board having a second edge, the second outside surface defining a second recess that extends from the second edge towards a second central region of the second water-resistant board;
    a support structure, the first and second water-resistant boards secured to the support structure such that the first edge of the first water-resistant board is adjacent the second edge of the second water-resistant board to form a joint therebetween; and
    a sealing strip applied over the joint and received within the first and second recesses such that the sealing strip forms a seamless joint between the first and second central regions.

12. The water-resistant system according to claim 11, wherein the first water-resistant board includes a first primer layer applied over the first central region of the first outside surface.

13. The water-resistant system according to claim 11, wherein the first water-resistant board including a first traffic coat forming an outer-most surface of the first outside surface and wherein the second water-resistant board includes a second traffic coat forming an outer-most surface of the second outside surface.

14. The water-resistant system according to claim 13, wherein each of the first and second traffic coats includes sand.

15. The water-resistant system according to claim 11, wherein the sealing strip is applied directly to the first recess of the first board and a second recess of the second board.

16. A water-resistant board comprising;
a substrate including an inside surface and an outside surface opposite the inside surface; the outside surface having a first edge, a second edge, a third edge, and a fourth edge; the first and second edges intersecting at a first corner; the second and third edges intersecting at a second corner; the third and fourth edges intersecting at a third corner; the outside surface having a central region positioned between the first, second, third, and fourth edges; the outside surface defines a first recess that extends from the first edge towards the central region and a second recess that extends from the second edge towards the central region, the central region including a traffic coat forming a portion of an outermost surface of the central region.

17. The water-resistant board according to claim 16, wherein the traffic coat includes sand.

18. The water-resistant board according to claim 16, wherein the central region includes a primer layer applied over the substrate.

19. The water-resistant board according to claim 18, wherein the central region includes a reinforced membrane bonded to the primer layer, the traffic coat bonded to the reinforced membrane.

20. The water-resistant board according to claim 1, wherein the second depth is twice the first depth.

\* \* \* \* \*